United States Patent [19]
Sasage et al.

[11] Patent Number: 6,071,840
[45] Date of Patent: Jun. 6, 2000

[54] DARK GREEN COLORED GLASS

[75] Inventors: Mizuki Sasage; Takashi Kijima; Shiro Tanii, all of Yokohama, Japan

[73] Assignee: Asahi Glass Company Ltd., Tokyo, Japan

[21] Appl. No.: 08/860,470

[22] PCT Filed: Nov. 11, 1996

[86] PCT No.: PCT/JP96/03302

§ 371 Date: Jul. 23, 1997

§ 102(e) Date: Jul. 23, 1997

[87] PCT Pub. No.: WO97/17303

PCT Pub. Date: May 15, 1997

[30] Foreign Application Priority Data

Nov. 10, 1995 [JP] Japan ..................... 7-292599

[51] Int. Cl.$^7$ .............. C03C 3/087; C03C 4/02
[52] U.S. Cl. ............. 501/71; 501/904; 501/905
[58] Field of Search ............... 501/71, 904, 905

[56] References Cited

U.S. PATENT DOCUMENTS

| | | | |
|---|---|---|---|
| 4,106,076 | 8/1978 | Pons | 501/71 |
| 5,318,931 | 6/1994 | Nakaguchi et al. | 505/71 |
| 5,411,922 | 5/1995 | Jones. | |
| 5,545,596 | 8/1996 | Alvarez Casariego et al. | 501/71 |
| 5,650,365 | 7/1997 | Higby et al. | 501/71 |
| 5,763,342 | 6/1998 | Mita et al. | 501/71 |

FOREIGN PATENT DOCUMENTS

| | | |
|---|---|---|
| 0 653 388 | 5/1995 | European Pat. Off. . |
| 0 705 800 | 4/1996 | European Pat. Off. . |
| 2 274 841 | 8/1994 | United Kingdom . |

*Primary Examiner*—Michael Marcheschi
*Attorney, Agent, or Firm*—Oblon, Spivak, McClelland, Maier & Neustadt, P.C.

[57] ABSTRACT

A dark green colored glass comprising 100 parts by weight of a matrix component of soda lime silicate glass, and, as coloring components, from 0.5 to 2.0 parts by weight of total iron calculated as $Fe_2O_3$, more than 1.0 to 3.0 parts by weight of total titanium calculated as $TiO_2$, from 0.003 to 0.02 part by weight of CoO, from 0 to 0.0008 part by weight of Se, from 0 to 0.05 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 15 to 50%.

16 Claims, No Drawings

DARK GREEN COLORED GLASS

This application is a 371 of International Application No. PCT/JP69/03302, filed Nov. 11, 1996.

TECHNICAL FIELD

The present invention relates to a dark green colored glass having low visible light transmittance, low ultraviolet ray transmittance and low solar radiation transmittance, which is suitable for a sunroof or rear window glass of an automobile.

BACKGROUND ART

In recent years, along with a trend for high quality of glasses for vehicles, an optimum glass is required for each application site. For example, for a rear window glass of an automobile, a glass which has, in a thickness of 5 mm, a visible light transmittance (illuminant A) of from 25 to 40% and a solar radiation transmittance of from 10 to 30% is used, and for a sunroof, a glass which has a visible light transmittance (illuminant A) of at most 30% and a solar radiation transmittance of at most 20%, is frequently used. The properties commonly required for these glasses are such that they have low visible light transmittance and low solar radiation transmittance, and preferably low ultraviolet ray transmittance, particularly low light transmittance at a wavelength of 370 nm, is desired.

Meantime, in recent years, a green colored glass which has high visible light transmittance and which at the same time has low solar radiation transmittance and low ultraviolet ray transmittance, has been used for a windshield, and to secure harmony in the color of the vehicle, it is preferred that the rear window glass or the like also has a green type color.

Most of well known heat absorbing glasses having relatively low visible light transmittance contain nickel. However, nickel is not desirable, since it sometimes forms nickel sulfide in glass. Nickel sulfide is almost indistinguishable by naked eyes and presents no adverse effects to glass in a usual state. However, if nickel sulfide is present in glass after toughening treatment by quenching, the volume will expand due to crystal transformation at room temperature, and a thermal stress sufficient to break the glass may sometimes be formed.

JP-A-2-64038 (which corresponds to U.S. Pat. No. 4,873,206) or JP-A-4-275943 (which corresponds to EP-A-482253) discloses a glass which contains no nickel and which has a visible light transmittance of lower than 40%. However, the one disclosed in JP-A-2-64038 has a problem that the solar radiation transmittance tends to be high, since its infrared ray shielding ability is not so high. The one disclosed in JP-A-4-275943 has a large content of iron and thus has a practical problem in its production such that it takes time to change the base material.

Further, JP-A-6-247740 discloses a glass having visible light transmittance reduced by replacing a NiO component by a chromium component. However, this relates to a glass having a relatively long dominant wavelength and low excitation purity by an addition of selenium in an amount of at least 15 ppm, and it is intended to obtain a neutral (gray) color i.e. not a green color.

Still further, U.S. Pat. No. 5,411,922 discloses a glass having low visible light transmittance which contains at least 10 ppm of selenium as an essential component in addition to iron, cobalt and titanium. In a glass melting furnace, Se is most volatile and an expensive material, and among Se put into the furnace, at least 90% will be discharged out of the furnace together with a combustion exhaust gas and will be captured, for example, by an absorbing liquid in an absorption tower for flue gas desulfurization. The major portion of Se in the liquid will be recovered and utilized as a raw material, but in order to carry out treatment to sufficiently reduce Se ions remaining in the liquid after the recovery, large amounts of investment for installation and running costs will be required. In Japan, a regulation relating to Se concentration in an industrial waste water is expected to come into force from 1997.

Further, Examples 11 to 13 in U.S. Pat. No. 5,411,922 describe an influence of an addition of titanium in a certain specific glass containing iron, cobalt and selenium as essential components. According to the description, as the titanium content is increased from 0 to 0.63 wt %, the dominant wavelength changes from 484.6 nm to 541.4 nm, and at the same time, the excitation purity decreases from 9.3% to 1.8%, whereby a neutral (gray) color tends to be readily obtainable.

Japanese PCT publication JP-6-503300 (which corresponds to EP-A-536049) discloses that to obtain a heat absorbing glass having a visible light transmittance of less than 40%, iron is added in an amount of at least 1 wt %, or $Cr_2O_3$ is added in an amount of at least 0.025 wt %. The same is disclosed in French Patent 2,682,102 which corresponds to the basic application from which the convention priority is claimed in EP-A-536049.

As mentioned above, addition of iron in an amount of at least 1 wt % may bring about a practical problem such that it takes time to change the base material. On the other hand, addition of $Cr_2O_3$ in a substantial amount is likely to lead to formation of a foreign substance due to formation of a chromite. Accordingly, the technique based on a combination of iron and chromium only as disclosed in Japanese PCT publication JP-6-503300 is hardly applicable to a case where a glass having still lower visible light transmittance is to be obtained. Further, even in a case where a glass having a visible light transmittance at a level of from 25 to 40% is to be obtained, it is a substantial merit that a lower iron content and a lower chromium content can both be satisfied from a viewpoint such that stable production can thereby be made possible.

Further, EP-A-653388 discloses a gray glass having at least 50 ppm of NiO and/or at least 9 ppm of Se added.

An object of the present invention is to solve the above problems of the prior art and to obtain a glass which contains no or little Se and has relatively low contents of total iron and chromium in spite of low visible light transmittance and solar radiation transmittance and which exhibits a dark green color.

Another object is to obtain a glass which is readily meltable and can be produced by a conventional float glass production process and which exhibits a dark green color with the ultraviolet ray transmittance controlled to be substantially low.

DISCLOSURE OF THE INVENTION

The present invention provides a dark green colored glass comprising 100 parts by weight of a matrix component of soda lime silicate glass, and, as coloring components, from 0.5 to 2.0 parts by weight of total iron calculated as $Fe_2O_3$, more than 1.0 to 3.0 parts by weight of total titanium calculated as $TiO_2$, from 0.003 to 0.02 part by weight of CoO, from 0 to 0.0008 part by weight of Se, from 0 to 0.05 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 15 to 50%.

Typically, the glass of the present invention has, in a thickness of 5 mm, a visual light transmittance (illuminant A) of at most 55% and a solar radiation transmittance of at most 50%. Further, it has, in a thickness of 5 mm, a transmittance of light having a wavelength of 370 nm of at most 25%.

BEST MOST FOR CARRYING OUT THE INVENTION

The glass of the present invention is the one having predetermined amounts of coloring components incorporated to 100 parts by weight of a matrix component of soda lime silicate glass. The coloring components will be described below.

If the content of the total iron calculated as $Fe_2O_3$ is less than 0.5 part by weight, the visible light transmittance tends to be too high, and if it exceeds 2.0 part by weight, the flame radiation heat is thereby blocked during melting so that the heat tends to hardly reach the interior of the molten glass, whereby melting tends to be difficult, and at the same time, the specific gravity of the molten glass tends to be large, thus leading to a substantial practical problem such that it takes time for changing the base material.

Among the total iron, the content of ferrous iron calculated as $Fe_2O_3$ is from 15 to 50% of the total iron calculated as $Fe_2O_3$. If the content of ferrous iron is less than 15%, the solar radiation transmittance tends to be too high. If it exceeds 50%, the flame radiation heat is thereby blocked so that the heat tends to hardly reach the interior of the molten glass, whereby melting tends to be difficult, and due to formation of ferric sulfide, an amber color is likely to form.

A preferred content of the total iron (calculated as $Fe_2O_3$) is from 0.5 to 1.5 parts by weight per 100 parts by weight of the matrix component, and a preferred content of FeO is from 0.15 to 0.40 part by weight, particularly from 0.20 to 0.40 part by weight, per 100 parts by weight of the matrix component.

Titanium together with cobalt and iron contained as coloring components, colors a glass with a dark green color. With a glass of this type, it is common that in order to obtain a green color, a glass excellent in a bluish tint is prepared with iron and cobalt, and a suitable amount of Se is added thereto to add a reddish tint thereby to produce a green color. Whereas, in the present invention, more than 1.0 part by weight of $TiO_2$ is added to 100 parts by weight of the matrix component, whereby the required amount of Se can be reduced. Especially, in the present invention, a green color can be formed even without incorporating Se.

Further, titanium is also a component to absorb ultraviolet rays. Especially, it plays an important role to reduce the transmittance of light with a wavelength of 370 nm.

If the total titanium calculated as $TiO_2$ is not more than 1.0 part by weight per 100 parts by weight of the matrix component, the transmittance of light with a wavelength of 370 nm tends to be high, and at the same time it tends to be difficult to obtain a glass having a dark green color. If it exceeds 3.0 parts by weight, its reaction with molten tin in the float bath tends to be not negligible. Preferably, the total titanium is at least 1.1 parts by weight per 100 parts by weight of the matrix component.

Further, vanadium which is not essential, may be incorporated up to 0.5 part by weight as the total vanadium calculated as $V_2O_5$, and cerium which is not essential, may be incorporated up to 0.5 part by weight as the total cerium calculated as $CeO_2$, to the glass of the present invention, whereby the transmittance of light having a wavelength of 370 nm can further be reduced.

Cobalt is an essential component incorporated to obtain low visible light transmittance. If the content of CoO is less than 0.003 part by weight per 100 parts by weight of the matrix component, the visible light transmittance tends to be too high, and if it exceeds 0.02 part by weight, the color of the glass tends to be bluish.

Addition of Se is not essential, but Se may be added to adjust the light transmittance in the visible and ultraviolet regions. If its content exceeds 0.0008 part by weight per 100 parts by weight of the matrix component, the dominant wavelength tends to be long. Further, if the content of Se is large, substantial installation and process steps will be required for the exhaust gas treatment, as mentioned above. Accordingly, the smaller the amount, the better. From this viewpoint, Se is preferably not substantially incorporated. Namely, it is preferred that it may not exceed the amount which is inevitably included as impurities.

Of course, depending upon the interior color of an automobile, it is possible to lower the excitation purity of glass for harmonization thereto and to adjust the color to slightly gray. In such a case, Se is added in an amount of at least 0.0002 part by weight, preferably at least 0.0003 part by weight, per 100 parts by weight of the matrix component. However, in the glass of the present invention, the change in excitation purity by an addition of Se is sharp, and if the amount of Se is large, the excitation purity tends to be too high, whereby a stable green color may sometimes be hardly obtainable. This tendency is particularly remarkable in a case where the amount of FeO is adjusted to be at least 0.28 part by weight, particularly at least 0.30 part by weight, per 100 parts by weight of the matrix component, in order to increase the ratio of the visible light transmittance to the solar radiation transmittance. Also from such a viewpoint, the amount of Se is at most 0.0008 part by weight, preferably at most 0.0006 part by weight, per 100 parts by weight of the matrix component.

Addition of chromium is not essential, but it may be added particularly in order to reduce the solar radiation transmittance. However, if the total chromium calculated as $Cr_2O_3$ exceeds 0.05 part by weight per 100 parts by weight of the matrix component, a foreign substance due to formation of a chromite is likely to form. To minimize such a possibility, the amount should better be small.

Nickel (NiO) is preferably not substantially incorporated in the present invention. A sunroof or a rear window glass of an automobile as the main application of the present invention, is usually treated for toughening, whereby if nickel is incorporated in the glass, it may cause natural breakage. Accordingly, it should not exceed an amount inevitably contained as impurities.

From the foregoing reason, in a preferred embodiment of the present invention, none of Se, chromium and nickel is substantially incorporated.

Further, in another preferred embodiment of the present invention, no nickel is substantially contained, but Se is incorporated in an amount of from 0.0002 to 0.0008 part by weight per 100 parts by weight of the matrix component, to provide a glass having a stable green color.

The soda lime silicate glass as the matrix component preferably comprises, by wt %, from 65 to 75% of $SiO_2$, from 0.1 to 5.0% of $Al_2O_3$, from 10 to 18% of $Na_2O+K_2O$, from 5 to 15% of CaO, from 0 to 6% of MgO, and from 0.05 to 1.0% of $SO_3$.

If the content of $SiO_2$ is less than 65%, the weather resistance tends to be poor, and if it exceeds 75%, devitrification is likely to result. If the content of $Al_2O_3$ is less than 0.1%, water resistance tends to be low, and if it exceeds 5%, the meltability tends to be low.

$Na_2O+K_2O$ are components which promote melting of the batch. If the total amount of the two is less than 10%, such an effect tends to be low, and if it exceeds 18%, the weather resistance tends to be poor.

CaO and MgO are components which promote melting of the batch and which improve the weather resistance. If the content of CaO is less than 5%, such effects tend to be low, and if it exceeds 15%, the glass tends to be devitrified. MgO is not essential, but may be incorporated. However, if it exceeds 6%, the glass tends to be devitrified.

$SO_3$ is used as a refining agent, and it usually remains in the glass in an amount of from 0.05 to 1.0%.

The glass of the present invention is particularly preferred as a sunroof and a rear window glass of an automobile and typically has the following optical properties. Namely, it is a glass having the above composition, and in a thickness of 5 mm, the visible light transmittance (illuminant A) $T_{va}$ is at most 55%, and the solar transmittance $T_e$ is at most 50%. Further, typically, the ultraviolet ray transmittance of a wavelength of 370 nm is at most 25%, preferably at most 20%. Further, in addition to the above optical properties, typically, the dominant wavelength $D_w$ as measured by illuminant C is from 480 to 560 nm, preferably from 480 to 550 nm, more preferably from 490 to 520 nm, and the excitation purity $P_e$ is from 4 to 16%, preferably from 6 to 15%, particularly preferably from 7 to 12%.

Further, in the present invention, it is preferred that the ratio ($T_{va}/T_e$) obtained by dividing the visible light transmittance (illuminant A) $T_{va}$ by the solar radiation transmittance $T_e$ is at least 1.3. If this ratio is small, the solar radiation shielding ability tends to be low relative to the visible light transmittance. Namely, the glass tends to be susceptible to the influence of the coldness and warmness of the exterior air although it may look otherwise.

In order to obtain optical properties suitable for a rear window glass, it is preferred to have the following composition of coloring components (embodiment A) within the above ranges.

Namely, relative to 100 parts by weight of the matrix component, the total iron calculated as $Fe_2O_3$ is from 0.7 to 1.0 part by weight, the total titanium calculated as $TiO_2$ is more than 1.0 to 3.0 parts by weight, CoO is from 0.01 to 0.02 part by weight, Se is from 0 to 0.0008 part by weight, the total chromium calculated as $Cr_2O_3$ is from 0 to 0.02 part by weight, the total vanadium calculated as $V_2O_5$ is from 0 to 0.5 part by weight, and the total cerium calculated as $CeO_2$ is from 0 to 0.5 part by weight, wherein the proportion of ferrous iron calculated as $Fe_2O_3$ in the total iron calculated as $Fe_2O_3$ is from 25 to 50%.

In order to lower the solar radiation transmittance to further increase $T_{va}/T_e$, it is preferred to adopt the following conditions within the above composition. Firstly, it is preferred to adjust the total titanium calculated as $TiO_2$ to a level of at least 1.1 part by weight, particularly at least 1.2 part by weight, per 100 parts by weight of the matrix component. Further, it is preferred to adjust the proportion of ferrous iron calculated as $Fe_2O_3$ in the total iron calculated as $Fe_2O_3$ to a level of at least 30%. Further, it is preferred to adjust the total iron calculated as $Fe_2O_3$ to a level of at most 0.9 part by weight, particularly at most 0.85 part by weight, per 100 parts by weight of the matrix component.

As mentioned above, depending upon the interior color of an automobile, for the harmonization thereto, the color may be adjusted to a stable green color which is slightly close to gray, and in such a case, Se may be added in an amount of from 0.0002 to 0.0008 part by weight, more preferably from 0.0003 to 0.0006 part by weight, per 100 parts by weight of the matrix component.

Typically, the glass having the composition of embodiment A has, in a thickness of 5 mm, a visible light transmittance (illuminant A) of from 25 to 40%, and a solar radiation transmittance of from 10 to 30%. Further, $T_{va}/T_e$ is large, and thus it exhibits a relatively clear green color.

The following composition may be mentioned as another preferred composition (embodiment B) of the glass of the present invention. Namely, it comprises 100 parts by weight of the matrix component, and, as coloring components, from 1.0 to 2.0 parts by weight of total iron calculated as $Fe_2O_3$, more than 1.0 to 3.0 parts by weight of total titanium calculated as $TiO_2$, from 0.01 to 0.02 part by weight of CoO, from 0 to 0.0008 part by weight of Se, from 0 to 0.02 part by weight of total chromium calculated as $Cr_2O_3$, from 0 to 0.5 part by weight of total vanadium calculated as $V_2O_5$, and from 0 to 0.5 part by weight of total cerium calculated as $CeO_2$, wherein the proportion of ferrous iron calculated as $Fe_2O_3$ in the total iron calculated as $Fe_2O_3$ is from 15 to 40%.

Typically, the glass of embodiment B has, in a thickness of 5 mm, a visible light transmittance (illuminant A) of at most 40% and a solar radiation transmittance of at most 30%.

In order to lower the solar radiation transmittance to further increase $T_{va}/T_e$, it is preferred to adopt the following conditions among the above composition. Firstly, it is preferred to adjust the total titanium calculated as $TiO_2$ to a level of at least 1.1 parts by weight, particularly at least 1.2 parts by weight, per 100 parts by weight of the matrix component. Further, it is preferred to adjust the proportion of ferrous iron calculated as $Fe_2O_3$ in the total iron calculated as $Fe_2O_3$ to a level of at least 20%.

Further, in a case where it is used as a rear window glass of an automobile, it is preferred to adjust the total iron calculated as $Fe_2O_3$ to a level of at most 1.4 parts by weight, per 100 parts by weight of the matrix component. In this way, it is possible to obtain a glass which has, in a thickness of 5 mm, a visible light transmittance (illuminant A) of from 25 to 40% and a solar radiation transmittance of from 10 to 30%.

Here, depending upon the interior color of the automobile, for harmonization thereto, the color may be adjusted to a stable green color slightly close to gray, and in such a case, Se may be added in an amount of from 0.0002 to 0.0008 part by weight, more preferably from 0.0003 to 0.0006 part by weight, per 100 parts by weight of the matrix component, as mentioned above.

Further, in a case where it is used for a sunroof or the like within the range of embodiment B, it is preferred to adjust the total iron calculated as $Fe_2O_3$ to a level of at least 1.2 parts by weight and CoO to a level of at least 0.012 part by weight, per 100 parts by weight of the matrix component. In this way, it is possible to obtain a glass which has, in a thickness of 5 mm, a visible light transmittance (illuminant A) of at most 25% and a solar radiation transmittance of at most 20%.

Further, in order to obtain optical properties suitable for a sunroof, the following composition of coloring components (embodiment C) may be adopted within the ranges of the glass composition of the present invention. Namely, it comprises, as coloring components, from 0.7 to 1.0 part by weight of total iron calculated as $Fe_2O_3$, more than 1.0 to 3.0 parts by weight of total titanium calculated as $TiO_2$, from 0.01 to 0.02 part by weight of CoO, from 0 to 0.0008 part by weight of Se, from 0.02 to 0.05 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 25 to 50%.

In order to lower the solar radiation transmittance to further increase $T_{va}/T_e$, it is preferred to adopt the following conditions within such a composition. Firstly, it is preferred to adjust the total titanium calculated as $TiO_2$ to a level of at least 1.1 parts by weight, particularly at least 1.2 parts by weight, per 100 parts by weight of the matrix component. Further, it is preferred to adjust the proportion of ferrous iron calculated as $Fe_2O_3$ in the total iron calculated as $Fe_2O_3$ to a level of at least 30%. Typically, this glass has, in a thickness of 5 mm, a visible light transmittance (illuminant A) of at most 35% and a solar radiation transmittance of at most 15%.

In a case where a glass having relatively high visible light transmittance is preferred among those for rear or rear side window glasses, the following composition of coloring components (embodiment D) may be adopted within the ranges of the glass composition of the present invention. Namely, it comprises, relative to 100 parts by weight of the matrix component, from 0.5 to 1.0 part by weight of total iron calculated as $Fe_2O_3$, more than 1.0 to 3.0 parts by weight of total titanium calculated as $TiO_2$, from 0.003 to 0.015 part by weight of CoO, from 0 to 0.0008 part by weight of Se, from 0 to 0.02 part by weight of total chromium calculated as $Cr_2O_3$, from 0 to 0.5 part by weight of total vanadium calculated as $V_2O_5$, and from 0 to 0.5 part by weight of total cerium calculated as $CeO_2$, wherein the proportion of ferrous iron calculated as $Fe_2O_3$ in the total iron calculated as $Fe_2O_3$ is from 25 to 50%.

Like embodiment A, in order to lower the solar radiation transmittance to further increase $T_{va}/T_e$, it is preferred to adopt the following conditions. Firstly it is preferred to adjust the total titanium calculated as $TiO_2$ to a level of at least 1.1 parts by weight, particularly at least 1.2 parts by weight, per 100 parts by weight of the matrix component. Further, it is preferred to adjust the proportion of ferrous iron calculated as $Fe_2O_3$ in the total iron calculated as $Fe_2O_3$ to a level of at least 30%. Further, it is preferred to adjust the total iron calculated as $Fe_2O_3$ to a level of at most 0.9 part by weight, particularly at most 0.85 part by weight, per 100 parts by weight of the matrix component.

Typically, the glass having the composition of embodiment D has, in a thickness of 5 mm, a visible light transmittance (illuminant A) of more than 40% and not more than 55% and a solar radiation transmittance of from 20 to 50%.

The dark green colored glass of the present invention can be produced by a method which comprises melting a glass by a conventional melting tank i.e. a melting tank of the type wherein a fuel is burned on the bath surface of a molten glass, and heating is carried out by the flame, and then supplying the molten glass to a usual float bath to form a glass ribbon having a predetermined thickness.

Further, throughout the present specification, the solar radiation transmittance $T_e$ is the one determined in accordance with JIS R3106. The visible light transmittance was measured by using illuminant A, and the dominant wavelength and the excitation purity were measured by using illuminant C.

Now, the Examples of the present invention will be described.

A batch prepared by using silica sand, feldspar, dolomite, soda ash, Glauber's salt, ferric oxide, titanium oxide, cobalt oxide, etc., as raw materials, so that coloring components as identified in Table 1, 2 or 3 were added to a matrix component comprising 72.1 wt % of $SiO_2$, 1.7 wt % of $Al_2O_3$, 7.8 wt % of CaO, 4.1 wt % of MgO, 13.5 wt % of $Na_2O$, 0.5 wt % of $K_2O$ and 0.3 wt % of $SO_3$, was melted in a melting tank of a conventional type, and the molten glass was supplied to a small size float test plant connected to the melting tank, to obtain a dark gray colored sheet glass.

In Tables 1 to 3, with respect to t-$Fe_2O_3$ (total iron calculated as $Fe_2O_3$), FeO, $TiO_2$, $CeO_2$ and $V_2O_5$, the units are parts by weight per 100 parts by weight of the total amount of the matrix components, and the units for CoO, $Cr_2O_3$ and Se are $10^{-4}$ parts by weight per 100 parts by weight of the total amount of the matrix components, and the unit for REDOX (the proportion of ferrous iron calculated as $Fe_2O_3$ in the total iron calculated as $Fe_2O_3$) is %.

With respect to these sheet glasses, the solar radiation transmittance $T_e$, the visible light transmittance $T_{va}$, the transmittance of a wavelength of 370 nm $T_{370}$, the dominant wavelength $D_w$ and the excitation purity $P_e$ (each of these values was calculated in a thickness of 5 mm) were obtained, and the results are shown in Tables 1 to 3.

Example 23 represents a case where $TiO_2$ is reduced. It is evident that the color tends to be bluish since the dominant wavelength is short. Example 24 contains no CoO, whereby an increase of the visible light transmittance is observed. Example 25 represents a case where the content of iron is small, whereby an increase in the transmittance at a wavelength of 370 nm is observed. Example 26 represents a case where sodium nitrate is introduced as an oxidizing agent to the raw materials to reduce the reduction ratio of iron, whereby the dominant wavelength is shifted to the reddish direction (the long wavelength side), and the solar radiation transmittance is not so reduced. Example 27 represents a case where CoO is added excessively, whereby the excitation purity increases remarkably, and the dominant wavelength is short, thus indicating that the color tends to be substantially bluish. In Example 28, the amount of Se is large, whereby the glass has a very high excitation purity.

Further, in Example 23 and Examples 25 to 28, the $T_{va}/T_e$ ratio is small, and the balance between the visible light transmittance and the solar radiation transmittance is poor. Namely, the glass has a low solar radiation shielding performance although it may look otherwise.

TABLE 1

| Examples | 1 | 2 | 3 | 4 | 5 |
| --- | --- | --- | --- | --- | --- |
| t-$Fe_2O_3$ | 0.8 | 0.8 | 0.8 | 0.8 | 0.5 |
| FeO | 0.22 | 0.27 | 0.27 | 0.24 | 0.15 |
| $TiO_2$ | 1.7 | 1.1 | 2.8 | 1.7 | 1.7 |
| CoO | 120 | 100 | 150 | 180 | 120 |
| $Cr_2O_3$ | | | | | |
| Se | | | | | |
| REDOX | 30 | 37 | 38 | 33 | 34 |
| $T_e$ (%) | 25.4 | 24.4 | 14.2 | 190 | 35.3 |
| $T_{va}$ (%) | 39.4 | 40.9 | 28.0 | 27.4 | 48.4 |
| $T_{370}$ (%) | 13.3 | 20.7 | 11.2 | 13.9 | 16.3 |

TABLE 1-continued

| | | | | | |
|---|---|---|---|---|---|
| $D_w$ (nm) | 496 | 490 | 507 | 487 | 492 |
| $P_e$ (%) | 7.7 | 12.5 | 6.0 | 15.9 | 7.4 |
| $T_{va}/T_e$ | 1.55 | 1.68 | 1.96 | 1.44 | 1.37 |
| Examples | 6 | 7 | 8 | 9 | 10 |
| t-$Fe_2O_3$ | 1.0 | 0.9 | 0.8 | 0.8 | 0.8 |
| FeO | 0.25 | 0.32 | 0.22 | 0.22 | 0.22 |
| $TiO_2$ | 1.7 | 1.7 | 1.7 | 1.7 | 1.7 |
| CoO | 150 | 30 | 120 | 120 | 120 |
| $Cr_2O_3$ | | | 100 | 150 | |
| Se | | | | | 8 |
| REDOX | 28 | 40 | 30 | 30 | 30 |
| $T_e$ (%) | 17.3 | 21.3 | 24.8 | 24.1 | 24.1 |
| $T_{va}$ (%) | 27.2 | 48.6 | 37.3 | 36.4 | 35.6 |
| $T_{370}$ (%) | 6.9 | 5.6 | 7.0 | 5.8 | 4.4 |
| $D_w$ (nm) | 495 | 547 | 511 | 520 | 542 |
| $P_e$ (%) | 9.8 | 10.5 | 5.0 | 5.2 | 6.1 |
| $T_{va}/T_e$ | 1.57 | 2.29 | 1.50 | 1.51 | 1.48 |

TABLE 2

| Examples | 11 | 12 | 13 | 14 | 15 |
|---|---|---|---|---|---|
| t-$Fe_2O_3$ | 0.8 | 0.08 | 0.8 | 0.8 | 1.3 |
| FeO | 0.22 | 0.22 | 0.20 | 0.27 | 0.36 |
| $TiO_2$ | 1.7 | 1.7 | 1.7 | 1.7 | 1.05 |
| CoO | 120 | 120 | 150 | 150 | 120 |
| $Cr_2O_3$ | | | | | |
| Se | 5 | 3 | | | |
| $CeO_2$ | | | 0.5 | | |
| $V_2O_5$ | | | | 0.3 | |
| REDOX | 30 | 30 | 28 | 37 | 31 |
| $T_e$ (%) | 24.9 | 25.4 | 25.5 | 11.3 | 15.3 |
| $T_{va}$ (%) | 36.9 | 37.7 | 34.2 | 15.6 | 29.4 |
| $T_{370}$ (%) | 6.3 | 7.5 | 9.0 | 14.5 | 6.0 |
| $D_w$ (nm) | 520 | 508 | 493 | 513 | 496 |
| $P_e$ (%) | 4.1 | 4.5 | 9.5 | 7.7 | 10.5 |
| $T_{va}/T_e$ | 1.48 | 1.48 | 1.34 | 1.37 | 1.92 |
| Examples | 16 | 17 | 18 | 19 | 20 |
| t-$Fe_2O_3$ | 1.3 | 1.3 | 1.2 | 1.7 | 1.5 |
| FeO | 0.24 | 0.25 | 0.26 | 0.26 | 0.26 |
| $TiO_2$ | 1.05 | 1.05 | 1.5 | 1.5 | 1.5 |
| CoO | 140 | 140 | 150 | 150 | 150 |
| $Cr_2O_3$ | | | | | 100 |
| Se | 8 | 3 | | | |
| $CeO_2$ | | | | | |
| $V_2O_5$ | | | | | |
| REDOX | 20 | 21 | 24 | 17 | 19 |
| $T_e$ (%) | 17.2 | 18.9 | 12.9 | 1.9 | 3.3 |
| $T_{va}$ (%) | 23.4 | 27.6 | 21.9 | 6.3 | 11.0 |
| $T_{370}$ (%) | 4.3 | 5.9 | 12.5 | 7.7 | 12.6 |
| $D_w$ (nm) | 557 | 501 | 496 | 505 | 509 |
| $P_e$ (%) | 8.3 | 5.3 | 10.1 | 8.8 | 7.5 |
| $T_{va}/T_e$ | 1.36 | 1.46 | 1.70 | 3.31 | 3.38 |

TABLE 3

| Examples | 21 | 22 | 23 | 24 | 25 | 26 | 27 | 28 |
|---|---|---|---|---|---|---|---|---|
| t-$Fe_2O_3$ | 0.8 | 0.8 | 0.8 | 0.8 | 0.4 | 0.8 | 0.4 | 1.3 |
| FeO | 0.32 | 0.32 | 0.24 | 0.29 | 0.13 | 0.06 | 0.17 | 0.23 |
| $TiO_2$ | 1.7 | 1.7 | 0.8 | 1.7 | 1.7 | 1.7 | 1.5 | 1.05 |
| CoO | 120 | 120 | 165 | | 150 | 100 | 300 | 140 |
| $Cr_2O_3$ | 450 | 300 | | | | | | |
| Se | | | | | | | | 15 |
| REDOX | 45 | 45 | 33 | 40 | 35 | 8 | 48 | 20 |
| $T_e$ (%) | 7.7 | 9.9 | 26.8 | 27.7 | 36.2 | 45.6 | 14.3 | 16.1 |
| $T_{va}$ (%) | 26.6 | 29.2 | 32.7 | 57.5 | 46.3 | 49.2 | 16.1 | 20.6 |
| $T_{370}$ (%) | 9.8 | 13.4 | 28.4 | 12.4 | 46.2 | 15.9 | 64.8 | 3.2 |

TABLE 3-continued

| Examples | 21 | 22 | 23 | 24 | 25 | 26 | 27 | 28 |
|---|---|---|---|---|---|---|---|---|
| $D_w$ (nm) | 529 | 508 | 467 | 557 | 486 | 565 | 475 | 571 |
| $P_e$ (%) | 8.3 | 6.7 | 25.4 | 15.4 | 12.0 | 12.9 | 42.5 | 17.4 |
| $T_{va}/T_e$ | 3.44 | 2.96 | 1.22 | 2.07 | 1.28 | 1.08 | 1.13 | 1.28 | further, Table 4 shows the results of computer simulation carried out within the scope of the present invention.

TABLE 4

| Examples | 29 | 30 | 31 | 32 | 33 | 34 | 35 | 36 |
|---|---|---|---|---|---|---|---|---|
| t-$Fe_2O_3$ | 0.9 | 0.9 | 0.9 | 0.9 | 0.9 | 0.9 | 0.9 | 0.9 |
| FeO | 0.32 | 0.32 | 0.32 | 0.32 | 0.32 | 0.28 | 0.28 | 0.24 |
| $TiO_2$ | 1.4 | 1.6 | 1.6 | 1.8 | 1.8 | 1.6 | 1.8 | 1.8 |
| CoO | 160 | 150 | 160 | 150 | 160 | 160 | 160 | 160 |
| Se | | | | | | | | |
| REDOX | 40 | 40 | 40 | 40 | 40 | 35 | 35 | 30 |
| $T_e$ (%) | 18.5 | 17.8 | 17.5 | 16.8 | 16.5 | 19.5 | 18.6 | 20.6 |
| $T_{va}$ (%) | 29.7 | 30.4 | 28.8 | 29.6 | 28.0 | 29.9 | 29.0 | 30.1 |
| $D_w$ (nm) | 490 | 493 | 492 | 495 | 493 | 491 | 493 | 493 |
| $P_e$ (%) | 15.2 | 12.4 | 13.7 | 10.9 | 12.1 | 13.0 | 11.4 | 10.7 |
| $T_{va}/T_e$ | 1.61 | 1.71 | 1.65 | 1.76 | 1.70 | 1.53 | 1.56 | 1.46 |

Further, Table 5 shows the results of computer simulation for the effects of adding a small amount of Se. It is evident that by the addition of Se, the excitation purity once decreases, but by an excessive addition, it tends to increase again.

TABLE 5

| Examples | 37 | 38 | 39 | 40 | 41 |
|---|---|---|---|---|---|
| t-$Fe_2O_3$ | 1.3 | 1.3 | 1.3 | 1.3 | 1.3 |
| FeO | 0.36 | 0.36 | 0.36 | 0.36 | 0.36 |
| $TiO_2$ | 1.05 | 1.05 | 1.05 | 1.05 | 1.05 |
| CoO | 120 | 120 | 120 | 120 | 120 |
| Se | 1 | 2 | 3 | 4 | 5 |
| REDOX | 31 | 31 | 31 | 31 | 31 |
| $T_e$ (%) | 15.1 | 14.9 | 14.7 | 14.5 | 14.3 |
| $T_{va}$ (%) | 29.1 | 28.8 | 28.5 | 28.2 | 27.9 |
| $D_w$ (nm) | 499 | 503 | 510 | 523 | 539 |
| $P_e$ (%) | 8.5 | 6.7 | 5.3 | 5.1 | 6.6 |
| $T_{va}/T_e$ | 1.93 | 1.93 | 1.94 | 1.94 | 1.95 |
| Examples | 42 | 43 | 44 | 45 | 46 |
| t-$Fe_2O_3$ | 1.3 | 1.3 | 1.3 | 1.3 | 1.3 |
| FeO | 0.36 | 0.36 | 0.36 | 0.36 | 0.36 |
| $TiO_2$ | 1.05 | 1.05 | 1.05 | 1.05 | 1.05 |
| CoO | 120 | 120 | 120 | 120 | 120 |
| Se | 6 | 7 | 8 | 9 | 1o |
| REDOX | 31 | 31 | 31 | 31 | 31 |
| $T_e$ (%) | 14.1 | 13.9 | 13.7 | 13.6 | 13.4 |
| $T_{va}$ (%) | 27.6 | 27.3 | 27.0 | 26.7 | 26.4 |
| $D_w$ (nm) | 550 | 557 | 561 | 564 | 567 |
| $P_e$ (%) | 8.6 | 10.8 | 12.9 | 15.1 | 17.3 |
| $T_{va}/T_e$ | 1.95 | 1.96 | 1.97 | 1.97 | 1.98 |

INDUSTRIAL APPLICABILITY

As described above, the dark green colored glass of the present invention has low visible light transmittance, whereby the solar transmittance and the ultraviolet ray transmittance are reduced to a large extent. Further, it can be readily melted by a melting tank of a conventional type and can be produced by a float process which is excellent in the productivity.

We claim:

1. A dark green colored glass comprising 100 parts by weight of a matrix component of soda lime silicate glass, and, as coloring components, from 0.5 to 2.0 parts by weight of total iron calculated as $Fe_2O_3$, more than 1.0 to 3.0 parts by weight of total titanium calculated as $TiO_2$, from 0.003 to 0.02 part by weight of CoO, from 0 to 0.0008 part by weight of Se, from 0 to 0.05 part by weight of total chromium calculated as $Cr_2O_3$, from 0 to 0.5 parts by weight of total vanadium calculated as $V_2O_5$ and from 0 to 0.5 part by weight of total cerium calculated as $CeO_2$, wherein the proportion of ferrous iron calculated as $Fe_2O_3$, in the total iron calculated as $Fe_2O_3$ is from 15 to 50%, and when said glass has a thickness of 5 mm it has a transmittance of light having a wavelength of 370 nm of at most 25%, a dominant wavelength of from 480 to 560 nm as measured by using illuminant C and an excitation purity of from 4 to 16% as measured by using illuminant C, and the ratio obtained by dividing the visible light transmittance (illuminant A) by the solar radiation transmittance is at least 1.3.

2. The dark green colored glass according to claim 1, wherein the glass with, a thickness of 5 mm, has a visible light transmittance (illuminant A) of at most 55%, and a solar radiation transmittance of at most 50%.

3. The dark green colored glass according to claim 1, which comprises 100 parts by weight of a matrix component of soda lime silicate glass and, as coloring components, from 0.7 to 1.0 part by weight of total iron calculated as $Fe_2O_3$, more than 1.0 to 3.0 parts by weight of total titanium calculated as $TiO_2$, from 0.01 to 0.02 part by weight of CoO, from 0 to 0.0008 part by weight of Se, from 0 to 0.02 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 25 to 50%.

4. The dark green colored glass according to claim 3, wherein the glass with, a thickness of 5 mm, has a visible light transmittance (illuminant A) of from 25 to 40%, and a solar radiation transmittance of from 10 to 30%.

5. The dark green colored glass according to claim 1, which comprises 100 parts by weight of a matrix component of soda lime silicate glass, and, as coloring components, from 1.0 to 2.0 parts by weight of total iron calculated as $Fe_2O_3$, more than 1.0 to 3.0 parts by weight of total titanium calculated as $TiO_2$, from 0.01 to 0.02 part by weight of CoO, from 0 to 0.0008 part by weight of Se, from 0 to 0.02 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 15 to 40%.

6. The dark green colored glass according to claim 1, which comprises 100 parts by weight of a matrix component of soda lime silicate glass, and, as coloring components, from 1.0 to 2.0 parts by weight of total iron calculated as $Fe_2O_3$, more than 1.0 to 3.0 parts by weight of total titanium calculated as $TiO_2$, from 0.01 to 0.02 part by weight of CoO, from 0.0002 to 0.0008 part by weight of Se, from 0 to 0.02 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 15 to 40%.

7. The dark green colored glass according to claim 5 or 6, wherein the glass with, a thickness of 5 mm, has a visible light transmittance (illuminant A) of at most 40%, and a solar radiation transmittance of at most 30%.

8. The dark green colored glass according to claim 1, which comprises 100 parts by weight of a matrix component of soda lime silicate glass, and, as coloring components, from 0.7 to 1.0 part by weight of total iron calculated as $Fe_2O_3$, more than 1.0 to 3.0 parts by weight of total titanium calculated as $TiO_2$, from 0.01 to 0.02 part by weight of CoO, from 0 to 0.0008 part by weight of Se, from 0.02 to 0.05 part by weight of total chromium calculated as $Cr_2O_3$, from 0 to 0.5 part by weight of total vanadium calculated as $V_2O_5$ and from 0 to 0.5 part by weight of total cerium calculated as $CeO_2$, wherein the proportion of ferrous iron calculated as $Fe_2O_3$ in the total iron calculated as $Fe_2O_3$ is from 25 to 50%.

9. The dark green colored glass according to claim 8, wherein the glass with, a thickness of 5 mm, has a visible light transmittance (illuminant A) of at most 35%, and a solar radiation transmittance of at most 15%.

10. The dark green colored glass according to claim 1, which comprises 100 parts by weight of a matrix component of soda lime silicate glass, and, as coloring components, from 0.5 to 1.0 part by weight of total iron calculated as $Fe_2O_3$, more than 1.0 to 3.0 parts by weight of total titanium calculated as $TiO_2$, from 0.003 to 0.015 part by weight of CoO, from 0 to 0.0008 part by weight of Se, from 0 to 0.02 part by weight of total chromium calculated as $Cr_2O_3$, from 0 to 0.5 part by weight of total vanadium calculated as $V_2O_5$, and from 0 to 0.5 part by weight of total cerium calculated as $CeO_2$, wherein the proportion of ferrous iron calculated as $Fe_2O_3$ in the total iron calculated as $Fe_2O_3$ is from 25 to 50%.

11. The dark green colored glass according to claim 10, wherein a 5 mm thickness has a visible light transmittance (illuminant A) of more than 40% and not more than 55%, and a solar radiation transmittance of from 20 to 50%.

12. The dark green colored glass according to claim 1, wherein the soda lime silicate glass comprises, by wt %, from 65 to 75% of $SiO_2$, from 0.1 to 5.0% of $Al_2O_3$, from 10 to 18% of $Na_2O+K_2O$, from 5 to 15% of CaO, from 0 to 6% of MgO and from 0.05 to 1.0% of $SO_3$.

13. The dark green colored glass according to claim 1, wherein a 5 mm thickness has a dominant wavelength of from 490 to 520 nm, as measured by using illuminant C.

14. The dark green colored glass according to claim 1, wherein the ratio obtained by dividing the visible light transmittance (illuminant A) by the solar radiation transmittance is at least 1.68.

15. The dark green colored glass according to claim 1, which contains substantially no NiO.

16. The dark green colored glass according to claim 10, which is produced by a float process.

* * * * *